(12) United States Patent
Ehrlich et al.

(10) Patent No.: US 7,698,965 B2
(45) Date of Patent: Apr. 20, 2010

(54) TRANSMISSION DEVICE FOR A MOTOR VEHICLE

(75) Inventors: Matthias Ehrlich, Buehl (DE); Norbert Esly, Buehl (DE)

(73) Assignee: Luk Lamellen und Kupplungsbau Beteiligungs KG, Buehl (DE)

( * ) Notice: Subject to any disclaimer, the term of this patent is extended or adjusted under 35 U.S.C. 154(b) by 1163 days.

(21) Appl. No.: 11/160,724

(22) Filed: Jul. 6, 2005

(65) Prior Publication Data

US 2006/0005654 A1 Jan. 12, 2006

(30) Foreign Application Priority Data

Jul. 8, 2004 (DE) .................... 10 2004 032 990

(51) Int. Cl.
*F16H 59/04* (2006.01)
*F16H 63/32* (2006.01)
*F16H 59/00* (2006.01)
*F16H 61/00* (2006.01)
*F16H 63/00* (2006.01)

(52) U.S. Cl. .................... 74/473.37; 74/335; 74/473.36

(58) Field of Classification Search .............. 74/473.36, 74/473.37, 335, 337.5
See application file for complete search history.

(56) References Cited

U.S. PATENT DOCUMENTS 1,928,782 A * 10/1933 Church .................. 74/359

7,353,726 B2 * 4/2008 Beer et al. .................... 74/340
2006/0150761 A1 7/2006 Beer et al.

FOREIGN PATENT DOCUMENTS

DE 10206561 10/2002
WO 2004/046588 6/2004

* cited by examiner

*Primary Examiner*—Thomas R Hannon
*Assistant Examiner*—Justin Krause
(74) *Attorney, Agent, or Firm*—Simpson & Simpson, PLLC

(57) ABSTRACT

The invention relates to a transmission device for a motor vehicle comprising a plurality of connecting elements that are mounted in an axially movable manner and are each provided with a shift mouthpiece and comprising an actuating device having a control shaft that is mounted in a swiveling and axially movable manner, on which is provided a main control element and at least one secondary control element, the at least one secondary control element having functional regions for a movement in the same direction as well as functional regions for movement in the opposite direction, the at least one secondary control element extending in its neutral position essentially perpendicular to the direction of movement of the connecting elements, and, with respect to this neutral position on the secondary control element and on at least one shift mouthpiece, the particular functional regions for the movement in the same direction being designed with a bent shape and being axially symmetric to the particular, likewise bent functional regions for the movement in the opposite direction, and specifically with respect to a plane that is defined by the axis of rotation of the control shaft and the direction of movement of the connecting element.

10 Claims, 5 Drawing Sheets

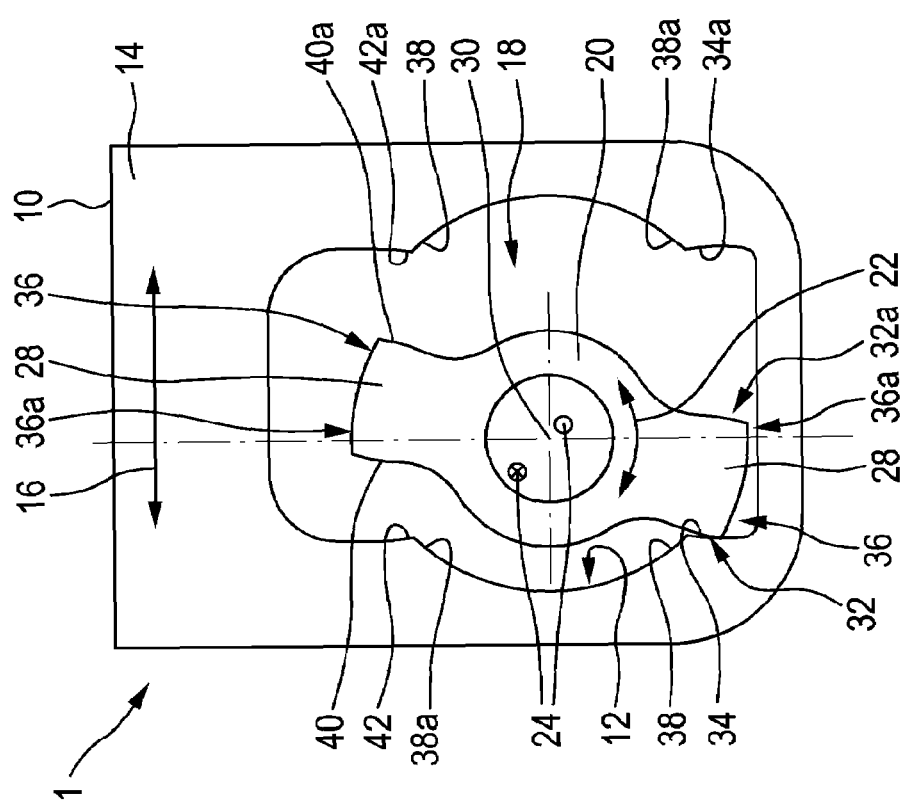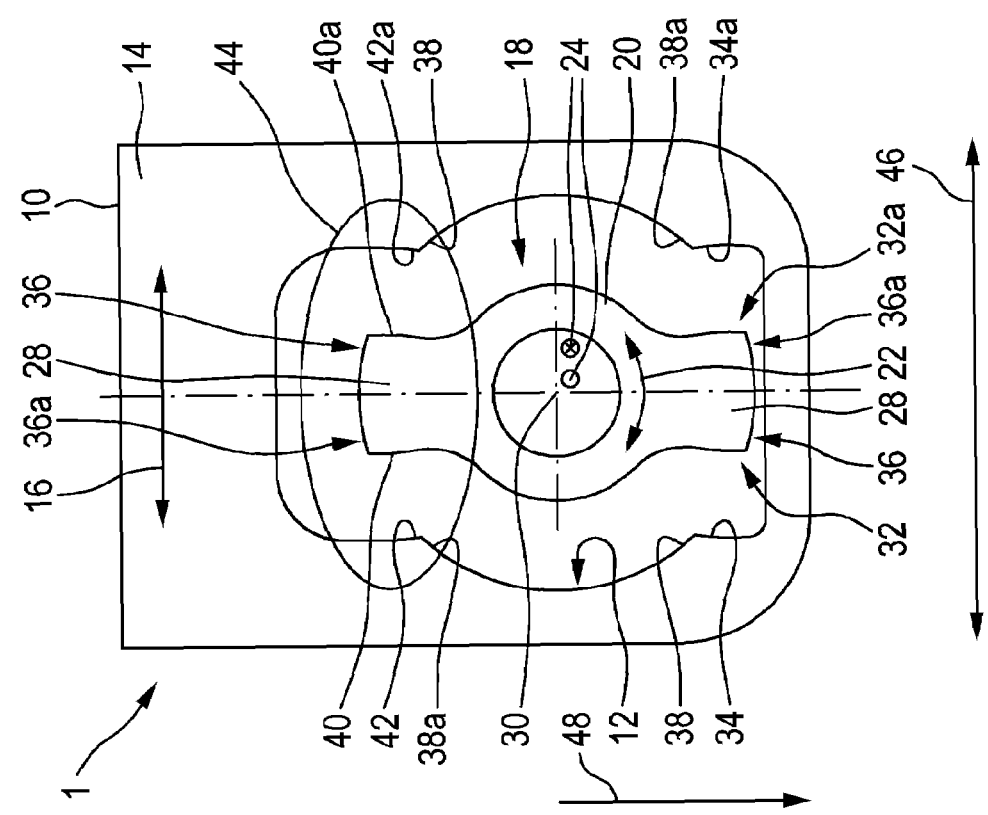

TRANSMISSION DEVICE FOR A MOTOR VEHICLE

CROSS REFERENCE TO RELATED APPLICATIONS

This application claims priority of German Patent Application No. 10 2004 032 990.7, filed Jul. 8, 2004, which application is incorporated herein by reference.

FIELD OF THE INVENTION

The invention relates to a transmission device for a motor vehicle and an assembly having a plurality of connecting elements and an actuation device for such a transmission device.

BACKGROUND OF THE INVENTION

For gear shifting operations in classically configured stepped motor vehicle transmission devices, the following three steps—starting from the old gear—are run through in timed sequence: "disengagement of the old gear"—"selection"—"engagement of the target gear". Moreover, motor vehicle transmission designs have become known in which the selection or select movement may occur before the disengagement of the old gear. In such configurations, it is provided, for example, that a main control element or shift finger is essentially responsible only for the engagement of gears and additional geometries take on the function of disengaging gears. In this context, secondary control elements are used for the disengagement function. It is further known that the additional geometries are located on the one hand on central shift shafts and on the other hand on shift mouthpieces that are provided on final output mechanisms or shift forks or shift rails.

The disengagement geometries as a rule are operative in gates in which the shift finger is not active. In this context, it may be provided that a fixed assignment between shift finger and disengagement geometry thereby simultaneously represents an active gear lock. Structural implementations of this approach are therefore also referred to as "active interlock".

In such an "active interlock", it is generally provided that the main control element or the shift finger may be moved back into a central or neutral position without disengaging the gear. The select movement is therefore possible before the gear is disengaged.

A transmission device known to the applicant in which the selection may be carried out before the disengagement of the old gear, or which is provided with "active interlock", is shown in partial view in FIGS. 4a to 4f. This transmission device 100 has several shift rails 104, each of which is a component of a particular final control mechanism 102. Each of the final control mechanisms 102 therefore has one shift rail 104.

In the illustration according to FIG. 4a, shown in particular is a shift rail 104 and the cross-section of a secondary control element 106. This secondary control element 106—just like main control element 108 shown in FIG. 4c—is rotatably mounted, and in particular about an axis 110. For this purpose main control element 108 and secondary control element 106—axially offset—are disposed on a rotating or actuating shaft 112 that is mounted in a rotatable and axially displaceable manner. A cutout, which represents a shift mouthpiece 114, is provided in each of shift rails 104. In FIG. 4a, both elements, that is, shift rail 104 and secondary control element 106, are located in the "neutral" shift position.

Shift mouthpiece 114 has one or two edges 116 and one or two flanks 118 that come into contact with secondary control element 106 via flanks 120 or edge 122 to disengage the gears. If flank 120 comes into contact with edge 116 as a result of a corresponding rotation of secondary control element 106 and triggers a translatory movement of shift rail 104 (see arrow 124), a "movement in the same direction" for secondary actuating element 106 and shift rail 104 is produced. If flank 122 comes into contact with edge 116 as a result of a corresponding rotation of secondary control element 106 and triggers a translatory movement of shift rail 104 (see arrow 124), a "movement in the opposite direction" for secondary control element 106 and shift rail 104 is produced. The connection is symbolically represented in FIG. 4b.

FIG. 4c shows shift rail 104 on the plane of main control element 108. Main control element 108 comes into contact with edge 130 of shift rail 104 via flank 128 of this main control element 108 as a result of the corresponding rotation of this main control element 108 and moves shift rail 104 in a translatory manner (see arrow 124). The disengagement and engagement movement phases occur according to the known scheme of active interlock. Therefore, it is provided in particular that when there is a movement, in this case rotation, of main control element 108 out of its neutral position (see FIG. 4c), secondary control elements 106 in other planes cooperate with shift rails 104 of the same partial transmission in such a manner that—if present—a shift rail 104 that is positioned outside of its neutral position is moved into its neutral position and these shift rails 104 that are positioned in other planes are locked in their neutral position by these secondary control elements 106 via their shift mouthpieces 114. When there is a continued rotation of main control element 108, it then acts on shift rail 104—inside of which it is positioned—in such a manner that this shift rail 104 is positioned in a disengaged position such that a gear ratio step is engaged via this shift rail 104.

FIG. 4d shows the projection from the different planes of main 108 and secondary control element 106. Both elements 106, 108 rotate continuously synchronously and actuate shift rails 104 of a partial transmission when a parallel shift transmission (PST) is used.

FIG. 4e shows secondary control element 106 when a "movement in the opposite direction" of shift rail 104 at an advanced angle of rotation is produced. For the purposes of comparison, FIG. 4f shows secondary control element 106 when a "movement in the same direction" of shift rail 104 is produced. The position of flank 118 at the height of axis of rotation 110 of secondary control element 106 in the position according to FIG. 4e leads to the problem that secondary control element 106 comes into contact with shift rail 104 at a very poor force application angle. Consequently, the resulting force for the translatory movement of shift rail 104 is substantially reduced, which under unfavorable friction or tolerance situations may lead to jamming. On the other hand, short-term jamming exerts an additional bending stress on shift rail 104.

In the position according to FIG. 4f, secondary control element 106 comes into contact with shift rail 104 at a favorable or more favorable force application angle. A jamming or a bending stress at the force application angle that is operative there is insignificant.

From German Patent Application 102 06 561 A1, a transmission device is known to the applicant in which the selection may be carried out before the disengagement of the old gear or which is provided with "active interlock". There it is proposed (FIG. 7, Illustration a, b, d, e), that the secondary control element be configured as a double cam (Illustration a, d) or as recesses or with recesses (Illustration d, e). In this neutral position, these secondary control elements are aligned in such a manner that they essentially extend in the displacement direction of the shift rail or the shift fork. Also in these designs, the force ratios when the shift fork is moved back into its neutral position are unfavorable. Furthermore, a design is proposed there (FIG. 7, Illustration c) in which the secondary control elements are configured in rectangular shapes and in their neutral position extend perpendicular to the direction of displacement of the shift fork. When the shift rail is moved into its neutral position, these rectangular-shaped areas of the secondary control element are engaged with likewise rectangular-shaped cutouts of the shift mouthpiece disposed—transverse to the displacement direction of the shift fork—above and below. It has been proven that the force ratios in this design are such that there is a rather high susceptibility to wear.

BRIEF SUMMARY OF THE INVENTION

The object of the present invention is to create a transmission device for motor vehicles in which the disengagement of gears may occur after the selection and in which, if there is good operational reliability, there are favorable force ratios during disengagement and in certain cases when gears are locked.

According to the invention, a transmission device as described in claim 1 or claim 2 is proposed. Furthermore, according to the invention, an assembly as described in claim 10 is proposed. Preferred embodiments are the subject matter of the dependent claims.

The assembly according to the invention may be used, for example, for an automated-shift transmission (AST) or for a twin-clutch transmission (TCT) or for a parallel-shift transmission (PST). These connecting elements, especially shift rails or shift forks, of this assembly, as well as the actuating device of this assembly may be designed in such a manner, for example, as is explained in relation to the connecting elements or the actuating device of the transmission device. This is especially true also for the cooperation of the actuation device and connecting elements. The transmission device according to the invention may in particular be or have such an AST, a TCT or a PST. In a transmission having two (parallel shifted) drive train branches, such as a PST, it is generally required that only one gear may be engaged at a time in each of the drive train branches. It may be provided that separate main and secondary control elements are provided for each of these drive train branches. It may also be provided that common main and secondary control elements are provided for both drive train branches or partial transmissions.

BRIEF DESCRIPTION OF THE DRAWINGS

An exemplary embodiment of the invention is described in detail below in reference to FIGS. 1 to 3. In the drawings:

FIG. 1 shows an exemplary system according to the invention having a secondary control element in its neutral position and a partially represented shift rail in its neutral position, this system being a component of an exemplary transmission device according to the invention;

FIG. 2 shows the system according to FIG. 1 with the secondary control element disengaged from the neutral position and the shift rail disengaged from the neutral position;

DETAILED DESCRIPTION OF THE INVENTION

Figure 3:
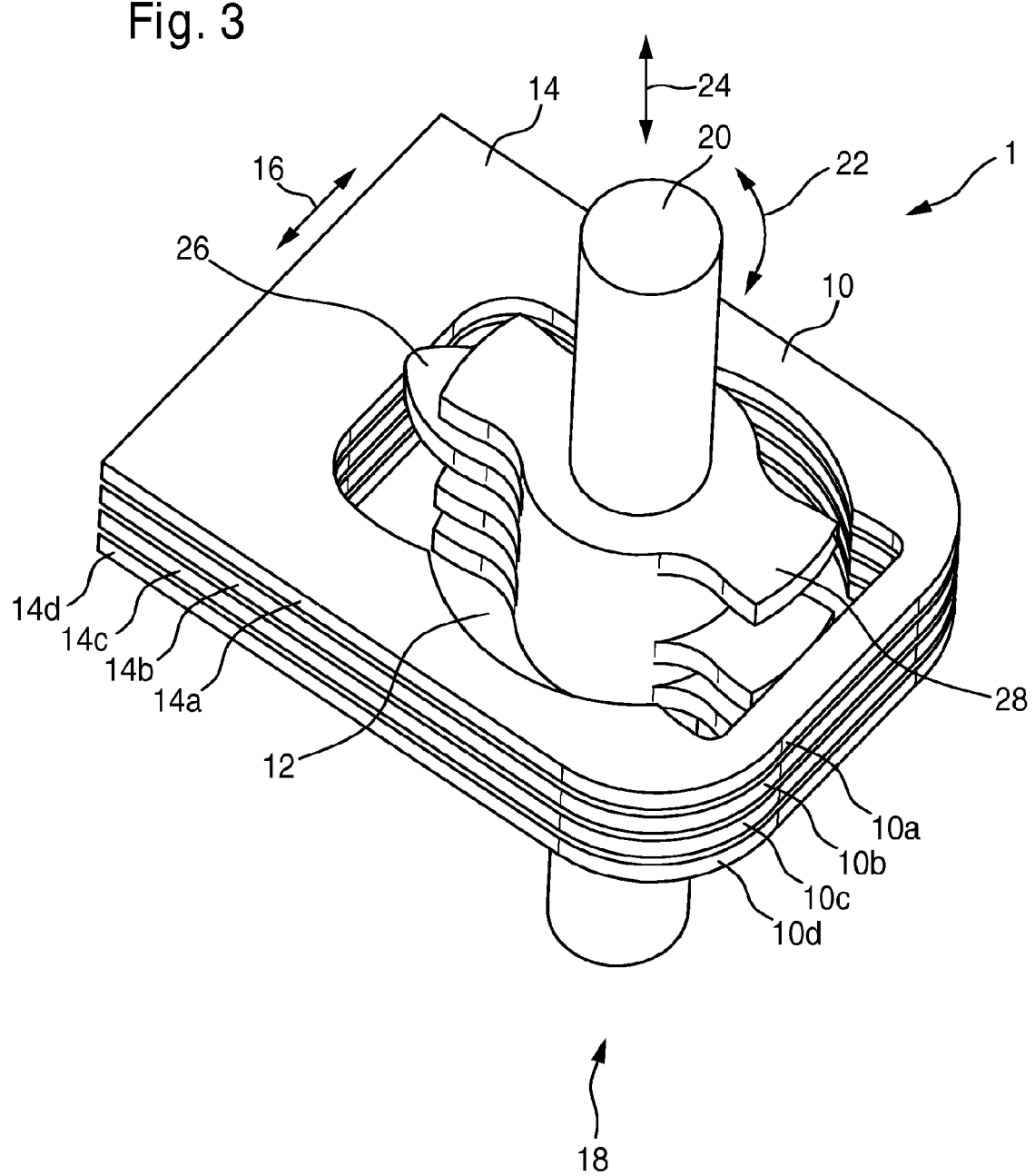
FIG. 3 shows an exemplary system according to the invention having partially represented shift rails, a control shaft, secondary control elements and a main control element, which is a component of an exemplary transmission device, especially a parallel-shift transmission, according to the invention; and, FIGS. 4a to 4f show a design previously known to the applicant in different views or planes.
Figure 4A:
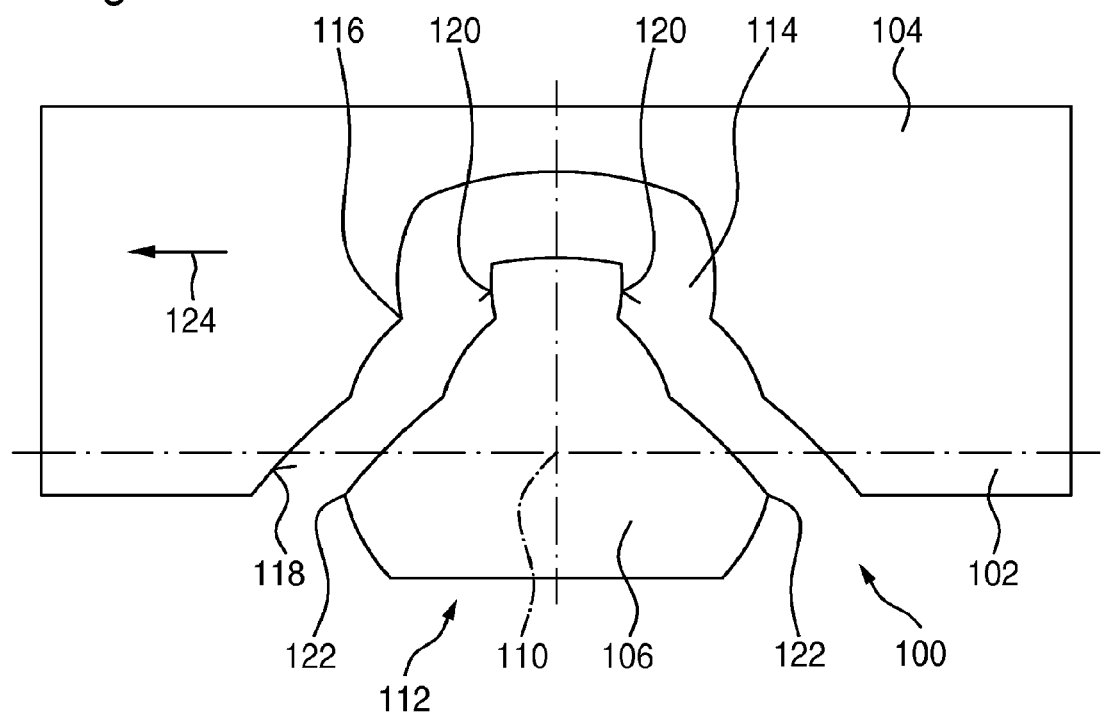
Figure 4B:
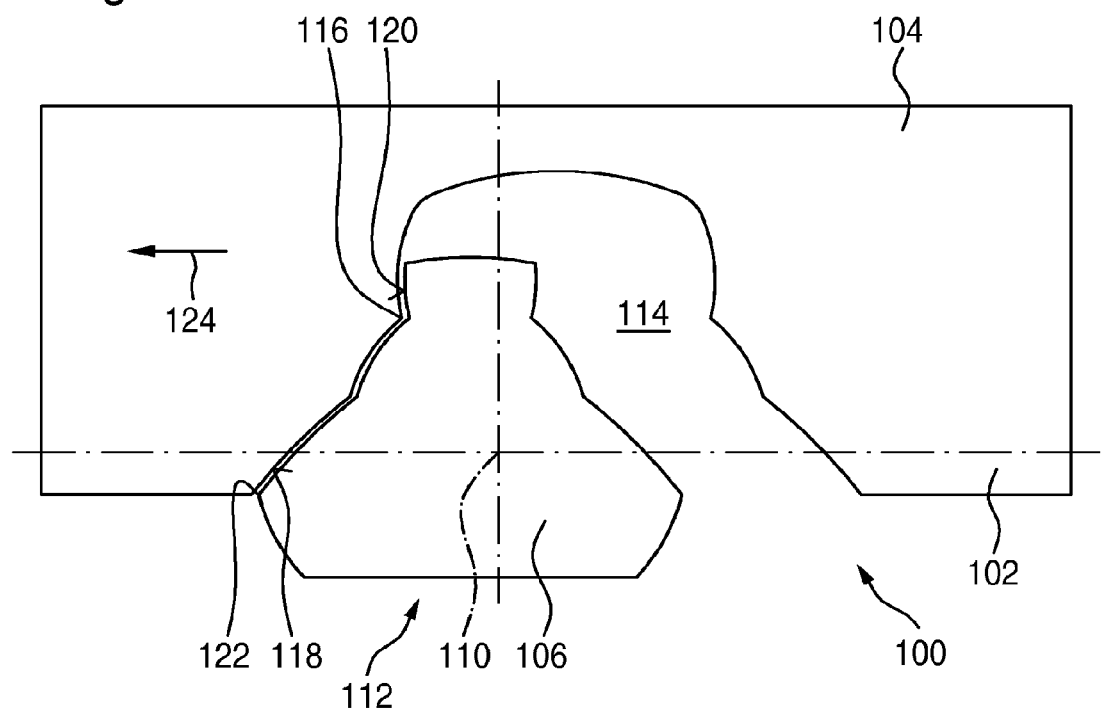
Figure 4C:
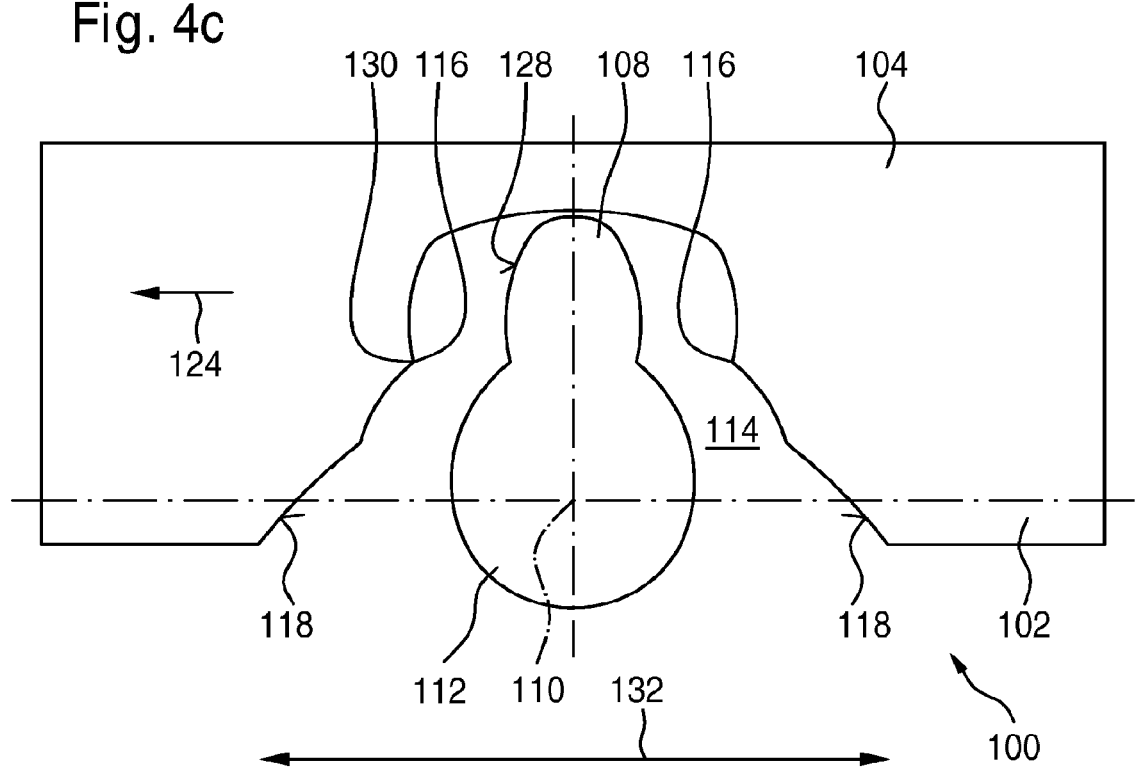
Figure 4D:
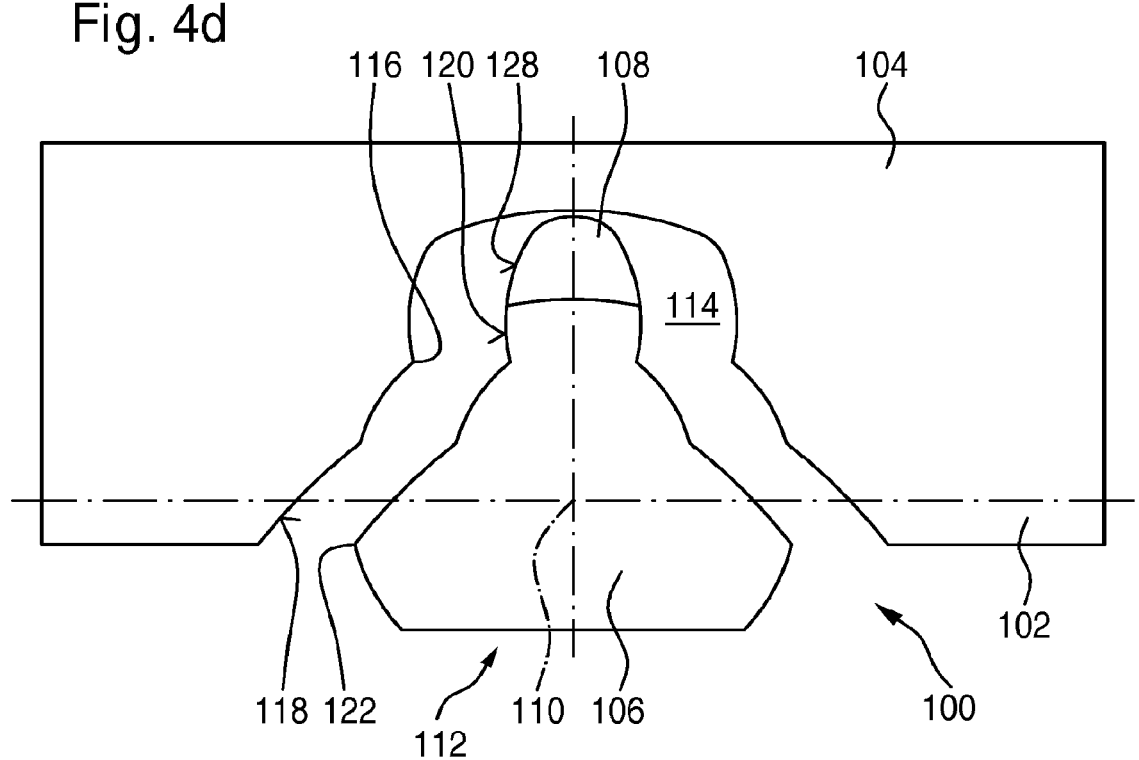
Figure 4E:
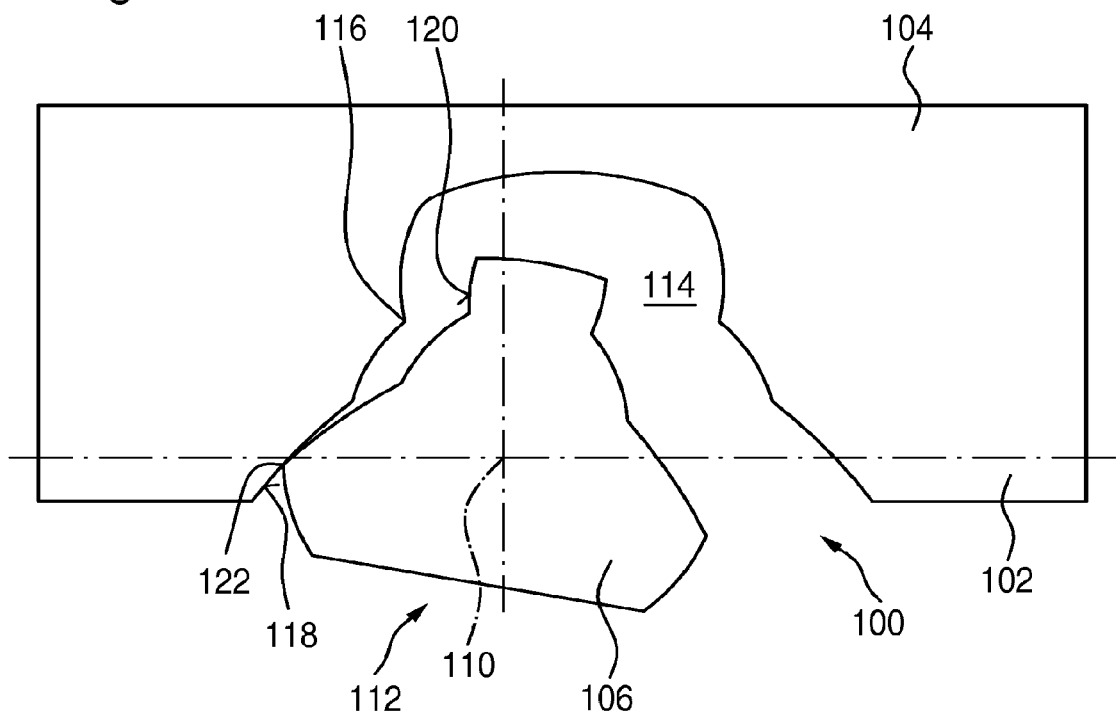
Figure 4F:
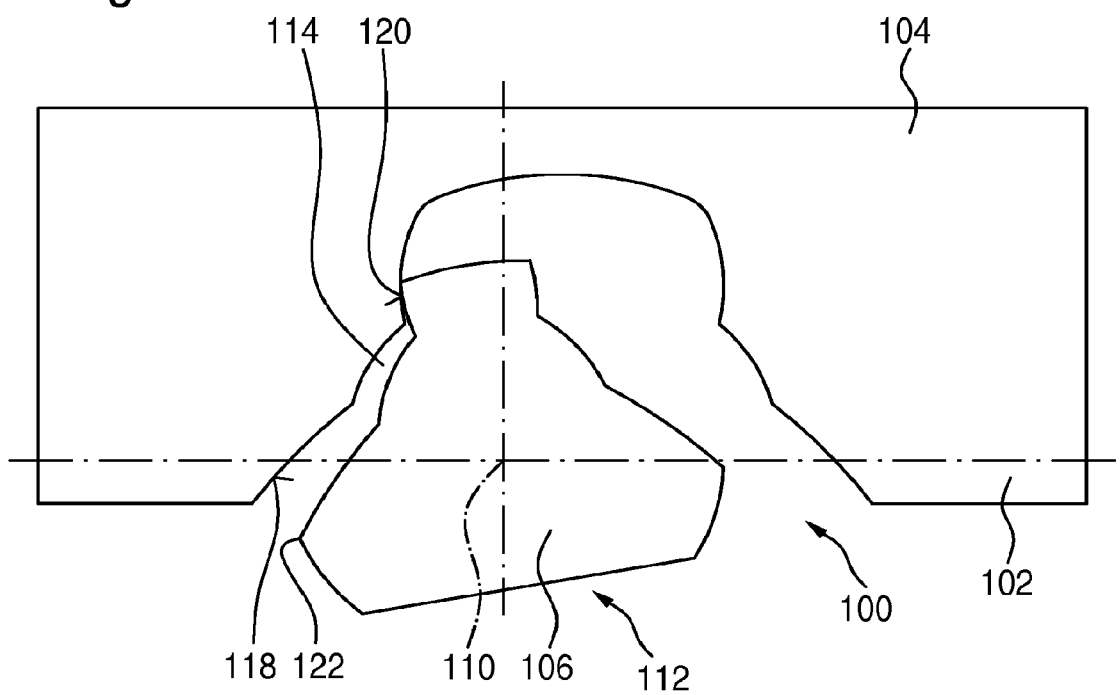

FIGS. 1 to 3 each show a partial view of an exemplary transmission device 1 according to the invention. This transmission device 1 has—not shown in this figure—a plurality of gear sets forming gear ratio steps. In this context, it may be provided that these gear sets, which are formed via wheels, especially gear wheels, each have one gear that is mounted so as to be rotatable in relation to its supporting shaft and is coupleable thereto via a final control element in order to engage a gear ratio step or a gear. Such a final control element may be, for example, a coupling sleeve, especially a movable one.

Moreover, a plurality of final control mechanisms is provided. In this context, these final control mechanisms are each assigned one or more of the gear ratio steps. The assignment between gear ratio steps and final control mechanism in this context is such that the gear ratio steps assigned to a final control mechanism may be engaged and disengaged via the particular final control mechanism. In this context, it is provided in particular that each of the gear ratio steps is assigned to only one of the final control mechanisms. It may be provided, for example, that two gear ratio steps are assigned to one, several or all of the final control mechanisms. However, it may also be provided that only one gear ratio step is assigned to one or several final control mechanisms. This may in particular be the case if the transmission or—in the case of a transmission that has a plurality of partial transmissions—an involved partial transmission has an uneven number of gear ratio steps or an uneven number of gear ratio steps forming forward gear speeds. It may be provided that each of the final control mechanisms has a connecting element 10 that is, for example, a shift rail or shift fork. Hereinafter the term "shift rail" is used, it being worth noting that there may be a different connecting element, such as a shift fork, in its place. It may in particular also be provided that such a final control mechanism has such a connecting element, such as a shift rail, and a final control element, such as a coupling sleeve. It may also be provided that the final control mechanisms comprise such a shift rail 10 as well as a coupling sleeve.

The shift rail or each shift rail 10 has a cutout or a shift mouthpiece 12. This shift mouthpiece 12, for example, is preferably designed as a closed configuration as shown in the figures. It may be mounted, as shown in FIGS. 1 to 3, on a projection 14 of shift rail 10. In FIG. 3, such projections 14 are provided with reference characters 14a, 14b, 14c and 14d for better distinguishability.

The remaining part of shift rail 10, which is not shown in FIGS. 1 to 3, may extend—as shown in FIG. 1 and FIG. 2—on the top end of projection 14, i.e., especially in the direction of movement or displacement of shift rail 10 that is schematically indicated by arrow 16. The direction 16 in which the connecting element or shift rail 1 is movable is also marked as the direction of movement. As has already been indicated, each of shift rails 10 is mounted in an axially displaceable manner. By appropriate axial displacement of such a shift rail 10, it is possible to cause a gear ratio step that is assigned to this shift rail 10 to be engaged or disengaged. Shift rails 10 may therefore also be positioned in such a manner that none of the gear ratio steps—which may also be called gears—assigned to the shift rail 10 in question is engaged. Such a position is called a neutral position of shift rail 10. For shift rails 10 to which two gear ratio steps are assigned, it is provided in particular that this shift rail 10—starting from a neutral position of this shift rail 10—may be moved in a first direction or orientation of the direction of movement of this shift rail in such a manner that the one gear ratio step assigned to this shift rail 10 is engaged, and in the other—opposite—orientation or direction of the direction of movement in order to cause the other gear ratio step assigned to this shift rail 10 to be engaged.

For the appropriate actuation of the final control mechanisms or shift rails 10, i.e., especially for the engagement and disengagement of gear ratio steps, a control device 18 is provided.

This control device 18 has a control shaft 20, which—as is indicated by double arrow 22—is mounted so that it can rotate or swivel. Moreover, this control shaft 20 is mounted in an axially movable manner, as is schematically indicated by arrow 24.

At least one main control element 26 and at least one secondary control element 28 are provided on this control shaft 20. In FIG. 3, a plurality of secondary control elements 28 are provided with reference characters 28a, 28b and 28c for the purpose of better distinguishability.

The actuation device 18 may—as is not depicted in FIGS. 1 to 3—have additional components. Therefore, it may be provided that the control device has two electric motors by means of which control shaft 20 may be driven directly or via interposed elements. This may the case, for example, so a first electric motor is provided by means of which control shaft 20 may be moved in its axial direction 24 and an additional electric motor by means of which control shaft 20 may be moved in its swiveling or rotating rotation. Because the movement in the axial direction 24 of control shaft 20 is used—as is explained further—for the selection, an electric motor producing this movement may also be called a select motor. Because gear ratio steps may be engaged or disengaged via a twisting or swiveling of control shaft 20, an electric motor that produces the corresponding rotary or swiveling movement of control shaft 20 may also be called a shift motor. Furthermore, it may be provided that such electric motors are drivable or are driven via an electronic control device.

Main control element 26 and secondary control element 28 or 28a, 28b, 28c are each fixedly mounted on control shaft 20. Therefore, if the control shaft is axially displaced (arrow 24), secondary control elements 28 and main control element 26 are displaced along with it. In a corresponding manner, main control element 26 and secondary control elements 28 are turned or swiveled along with control shaft 20 if it is turned or swiveled (arrow 22). Shift rails 10, which are provided with reference characters 10, 10b, 10c and 10d in FIG. 3 for better distinguishability, or their projections 14 are disposed essentially next to and parallel to each other. In this context, it is provided in particular that, if all shift rails 10 are positioned in their neutral position, that is, all gear ratio steps of the transmission or partial transmission in question are disengaged, the shift mouthpieces 12 of these shift rails 10 are flush with each other (see FIG. 3).

The engagement of gear ratio steps occurs—especially exclusively—via the main control element 26, which is formed in particular as a shift finger; the disengagement of gear ratio steps is accomplished using the specific secondary control element 28. If via main control element 26 a gear ratio step, also called a gear, is to be engaged, or is engaged, the secondary control elements ensure that all remaining gear ratio steps or gears of the same transmission or—if there is a plurality of partial transmissions—of the same partial transmission are disengaged before the target gear ratio step is or has been engaged via main control element 26. An explanation is given again below of how the so-called "shift" or the engagement of gear ratio steps and the disengagement of gear ratio steps functions in the exemplary embodiment. Furthermore, explanation is given of how the so-called "selection" functions in the exemplary embodiment.

For the selection, control shaft 20 is axially displaced. This occurs in particular at a position at which main control element 26, hereinafter referred to as shift finger 26, may be axially moved in such a manner that it is not possible to block its axial movement via shift rails or one of the shift rails. Such a position is in particular also called a neutral position (of shift rail 26). This axial movement of control shaft 20 or of shift finger 26 may be used to position shift finger 26 such that in a subsequent shift movement or rotary movement it can act on a final control mechanism or a given shift rail 10 in order to effect the engagement of a gear assigned to this final control mechanism or this shift rail 10.

To engage a gear, control shaft 20 is turned or swiveled (arrow 22) after the "selection". The direction or orientation of this rotary or swiveling movement depends on which of the gears assigned to the shift rails involved or to the final control mechanism involved is to be engaged. At the beginning of this swivel movement subsequent to the "selection", shift finger 26 overcomes a certain idle stroke. This idle stroke is in particular such that during this idle stroke shift finger 26 engages in associated shift rail 10 in a non-contacting manner, or this shift rail 10 does not yet move into its gear position. If the old gear is assigned to the same shift rail 10 as the target gear, it may also be provided that shift finger 26 already contacts the associated shift rail during its idle stroke. This may in particular be such that shift finger 26, starting from its neutral position, is swiveled in the direction into which it must be swiveled in order to effect the engagement of the target gear, shift finger 26 already coming into contact with shift rail 10 during the idle stroke and this shift rail 10 first being moved back into its neutral position during this idle stroke. During swivel movements of the shift finger 26 of this type, secondary control elements 28 are moved with it, because they are fixedly mounted on control shaft 20. In this context secondary control elements 28 are positioned in planes that are offset from shift finger 26. In this context, it is provided that secondary control elements 28 are in their respective neutral position if shift finger 26 is in its neutral position. During a movement of shift finger 26 in the direction of rotation, secondary control elements 28 in offset planes are therefore moved. In or during disengagement of an (old) gear via a shift rail 10, which is different from shift rail 10 to which the target gear is assigned and which is assigned to the same transmission or—in the case of a plurality of partial transmissions—to the same partial transmission, a secondary control element 28 acts on the shift rail 10 in question during the idle stroke of shift finger 26 in such a manner that, during this idle stroke of shift finger 26, the corresponding gear ratio step (old gear) is disengaged via secondary control element 28. Therefore, it is always ensured—especially via secondary control elements 28—that all gears of the transmission—or, if there is a plurality of partial transmissions, of the same partial transmission in question—are disengaged before a target gear is or has been engaged. Therefore, it is provided in particular that, if shift finger 26 is moved out of its neutral position during the idle stroke of this shift finger 26, then it is ensured via secondary control elements 28 that all or one of the shift rails 10 of the same transmission or partial transmission that are/is disengaged from their/its neutral position are/is moved into their/its neutral position, the secondary control elements 28 in other planes operating as shift fingers 26. To disengage corresponding gear ratio steps via secondary control elements 28, a corresponding functional region of such a secondary control element 28 acts on a functional region of a corresponding shift mouthpiece 12.

This is explained in detail with reference to FIGS. 1 and 2. While both secondary control element 28 and shift rail 10 there are shown in their neutral position, in the position according to FIG. 2, shift rail 10 is disengaged from its neutral position, specifically to the right. This may be easily recognized in reference to the different positions of axis of rotation 30 of control shaft 20 in relation to shift rail 10 in FIGS. 1 and 2. In FIG. 2, control shaft 20 is swiveled clockwise in relation to its neutral position. Because shift finger 26 is fixedly mounted on control shaft 20, it is swiveled accordingly. As may be easily inferred from FIG. 2, a functional region 32 of secondary control element 28 contacts a functional region 34 of shift mouthpiece 12.

Functional regions of secondary control element 28 or of shift mouthpiece 12 are in particular surface areas that serve a specific function, i.e., in cooperation with corresponding surface areas of the other element 12 or 28 that is involved. In the exemplary embodiment, shift mouthpiece 12 and secondary control element 28 each have functional regions for the movement in the same direction, functional regions for the movement in the opposite direction and functional regions for the locking.

In this context, functional regions 36, 36a of secondary control element 28 for the locking contact functional regions 38 or 38a for the locking of shift mouthpiece 12 if via secondary control element 28 shift mouthpiece 12 or its shift rail 10 is in a locked position. Such a locked position ensures in particular that it is not possible to move the shift rail 10 involved (unintentionally) in such a manner that a gear ratio step is engaged via this shift rail 10. This may in particular be such that in this way a gear ratio step—depending on the concrete design type—is prevented from being unintentionally engaged via entrainment or vibration or another manner. It is provided in particular that—apart from shift rail 10 of the target gear in question—all shift rails 10 of the transmission or—in the case of a plurality of partial transmissions—of the same partial transmission have been or are locked via secondary control element 28 before the target gear has been or is engaged. In this context it is provided in particular that the "locking" follows the "disengagement" or a movement that ensures the disengagement.

A functional region or functional regions of secondary control element 28 for a movement in the same direction are such that they cooperate in a contacting manner with a functional region or functional regions of shift mouthpiece 12 for a movement in the same direction if or as a result shift rail 10 is moved in the same direction. A functional region or functional regions of secondary control element 28 for a movement in the opposite direction are such that they cooperate in a contacting manner with a functional region or functional regions of shift mouthpiece 12 for a movement in the opposite direction if or so that shift rail 10 is moved in the opposite direction.

In this context, the movement "in the same direction" or "in the opposite direction" of shift rail 10 must be seen in comparison to shift rail 10, which is moved when there is a continued movement of control shaft 20 via shift finger 26.

This becomes very clear in FIGS. 1 to 3. As shown in FIG. 1, the shift mouthpiece is asymmetrically designed with respect to a plane extending through direction of movement 16 of shift rail 10 and axis or rotation 30 of control shaft 20. In this case, this asymmetry is such that the end of the shift mouthpiece lying on the one side of this plane—in this case the top—is farther away from the plane than the end of shift mouthpiece 12 lying on the other—in this case the bottom—side. As may be easily inferred from FIG. 3, the additional space on the top that results is used so that in this case the shift finger may be moved that extends further in the radial direction from axis of rotation 30 than secondary control element 28. The extending direction of shift finger 26 in the radial direction thereby corresponds essentially to the extending direction of the secondary control element. However, secondary control element 28 in this exemplary embodiment—in contrast to the shift finger—is designed as a double cam and thus projects in both opposing orientations of a radial direction of control shaft 20, while shift finger 26 projects only in one orientation of this radial direction.

With reference to FIG. 2, shift finger 26 in the swiveling position of secondary control element 28 shown there has therefore swiveled corresponding to the top portion double cam of secondary control element 28 and specifically in an offset plane. This is so that shift finger 26 in this offset plane—not shown in FIG. 2—following a correspondingly extensive swiveling displaces a shift rail 10 mounted parallel (there) to the right. In the plane according to FIG. 2, secondary control element 28 displaces shift rail 10 there to the left via functional regions 32, 34. In this movement, the two aforementioned shift rails are therefore moved in opposite directions so that these functional regions 32, 34 are for a movement in opposite directions. In a corresponding manner, functional regions 32a of secondary control element 28 or functional regions 34a of shift mouthpieces 12 are likewise functional regions for a movement in the opposite direction and functional regions 40, 40a of secondary control element 28 or functional regions 42, 42a of shift mouthpiece 12 are functional regions for a movement in the same direction.

In this context it is provided in particular that—especially as desired—functional regions 32 are able to cooperate with or contact functional regions 34, functional regions 32a with functional regions 34a, functional regions 40 with functional regions 42 and functional regions 40a with functional regions 42a. In this contacting, it may be provided in particular that there is a type of handoff of functional regions that are assigned to each other during the movement. As may be clearly inferred from FIGS. 1 and 2, functional regions 32, 34 or 32a, 34a for the movement in the opposite direction and functional regions 40, 42, 40a, 42a for the movement in the same direction are each configured—in this exemplary embodiment bent or curved—in an uneven shape. These functional regions for the movement in the same or opposite direction are convexly bent on the secondary control element and concavely bend on the shift mouthpiece. It may in particular be provided that these functional regions are configured in the manner of involutes or cycloids. The functional regions 36, 36a of secondary control element 28 for the locking, which in this case limit secondary control element 28 in the radially outward direction, are configured in this exemplary embodiment as segments of a cylinder or a circle. In this context it is provided in particular that the radius of these segments essentially corresponds to the radius of the circular or cylindrical segment sections of shift mouthpiece 12, which have functional regions 38, 38a of shift mouthpiece 12 for the locking.

It is provided in particular in the exemplary embodiment that for the rotation or swiveling of control shaft 20 in the clockwise direction, on the one hand, and for the rotation of control shaft 20 in the counterclockwise direction, on the other hand, in each case functional regions are provided for a movement in the same direction and functional regions are provided for movement in the opposite direction.

As shown in FIG. 1, in which secondary control element 28 is shown in its neutral position, in which it extends essentially perpendicular to direction of movement 16 of shift rail 10, in this neutral position functional regions 40, 40a (of secondary control element 28) for the movement in the same direction with respect to the aforementioned plane, which is extended through the direction of movement 16 of shift rails 10 and axis of rotation 30 of control shaft 20, which is essentially perpendicular thereto, are configured in an axially symmetric manner with respect to functional regions 32, 32a of secondary control element 28 for the movement in the opposite direction. Moreover, it is evident from FIG. 1 that functional regions 42, 42a of shift mouthpiece 12 for the movement in the same direction—with respect to the aforementioned plane—are axially symmetric to functional regions 34, 34a (of shift mouthpiece 12) for the movement in the opposite direction.

If via shift finger 26 a gear has been engaged or a shift rail 10 has been displaced in such a manner that a gear has been engaged, this shift finger 26 may be moved back into its central or neutral position without this gear or gear ratio step being disengaged again in the process.

Shown in particular in FIG. 1 is therefore an improved shift mouthpiece design and the associated secondary control element (both in the "neutral" shift position), which reduces or eliminates the defect of the unfavorable force application angle that is present in particular in the design according to FIGS. 4a to 4f for the secondary control element.

It is therefore provided in particular with this exemplary embodiment that region 44, which is used to produce a movement "in the same direction", is axially symmetric with respect to the central plane of the control shaft or rotary shaft 20. In this way (in this exemplary embodiment) a shift rail having a closed mouthpiece 12 results. The force application angle for producing the "movement in the opposite direction" is identical to the force application angle for producing the "movement in the same direction". Shown in FIG. 2 in particular is the secondary control element in the middle of the "disengagement" phase with "movement in the opposite direction". FIG. 3 in particular shows an overall system for the shift rails of a PST and the associated main and secondary control elements.

In this shift rail design—depicted in the exemplary embodiment—it has proven advantageous that the shift mouthpiece width 46 is narrower than in the known design according to FIGS. 4a to 4f (see reference character 132 there). For this purpose, only a little more overall height (see reference character 48) has to be taken into consideration in the region of the closed shift mouthpiece. Overall, a more robust shift mouthpiece with better operation is produced. According to the exemplary embodiment, the known design of the active interlock shift mouthpiece for control or rotary shaft actuation is modified in such a manner that the force application angle when there is a movement in the same direction of the secondary control element is improved. Therefore, in particular a robust active interlock shift mouthpiece for an improved or optimal action when the gears are disengaged, independent of the rotational direction of the secondary control element, is produced.

Compared to the known designs from FIG. 7, illustrations a, b, d and e of German Patent Application 102 06 561 A1, the design according to the invention, which is explained by example with reference to FIGS. 1 to 3, has the advantage that the force ratios are improved in the return movement of the shift fork or shift rail. In the exemplary design according to the invention, there are improved force application angles between secondary control element and shift mouthpiece or shift rail. Therefore, in particular at the same torque a greater force is applied to the shift rails in the direction of movement of the shift rails, and in particular at the beginning of the disengagement phase.

Furthermore—also in comparison to the design shown in Illustration c of the aforementioned FIG. 7—this makes it possible that both the functional regions for the movement in the same and opposite direction on the secondary control element are configured in an uneven or bent shape, and also makes it possible for the functional regions of the shift mouthpiece or the shift rail to produce more favorable movement or force ratios. Furthermore, it is advantageous, compared to the designs according to FIG. 7, that although the functional regions for the movement in the same or opposite direction are disposed or formed in the aforementioned manner axially symmetric on the shift mouthpieces with respect to the aforementioned plane, the shift mouthpiece—considered as a whole—is not designed axially symmetric with respect to this plane. In particular this enables a space-saving design of the shift mouthpiece, in which both main control element and the at least one secondary control element—as desired—can act on the same particular shift mouthpiece in order to actuate it.

Compared to the design according to Illustration c of the aforementioned FIG. 7, the design according to the exemplary embodiment of the invention that is explained in relation to FIG. 1 also has the advantage of lesser susceptibility to wear, which is present in the design according to Illustration c, especially at the corners of the rectangular contour. Furthermore, this facilitates the reduction—which may also be linked to the aforementioned aspect—of the surface pressure in the contact area.

List of Reference Characters

1 Transmission device
10 Connecting element, shift rail
10a Connecting element, shift rail
10b Connecting element, shift rail
10c Connecting element, shift rail
10d Connecting element, shift rail
12 Shift mouthpiece
14 Projection
16 Arrow
18 Actuation device
20 Control shaft
22 Double arrow in the swiveling direction of 20
24 Double arrow in the axial movement direction of 20
26 Main control element
28 Secondary control element
28a Secondary control element
28b Secondary control element
28c Secondary control element
30 Axis of rotation of 20
32 Functional region of 28 for movement in the opposite direction
32a Functional region of 28 for movement in the opposite direction
34 Functional region of 12 for movement in the opposite direction
34a Functional region of 12 for movement in the opposite direction
36 Functional region of 28 for locking
36a Functional region of 28 for locking
38 Functional region of 12 for locking
38a Functional region of 12 for locking 40 Functional region of 28 for movement in the same direction
40a Functional region of 28 for movement in the same direction
42 Functional region of 12 for movement in the same direction
42a Functional region of 12 for movement in the same direction
44 Region
46 Shift mouthpiece width
48 Overall height
100 Transmission device
102 Final control mechanism
104 Shift rail
106 Secondary control element
108 Main control element
110 Axis
112 Control shaft
114 Shift mouthpiece
116 Edge of 114
118 Flank of 114
120 Flank of 106
122 Edge of 106
124 Arrow (direction of movement of 104)
128 Flank of 108
130 Edge of 104
132 Shift mouthpiece width

What is claimed is:

1. A transmission device for a motor vehicle, comprising:
a plurality of gear sets forming gear ratio steps;
a plurality of connecting elements (10), including shift rails or shift forks, mounted in an axially movable manner;
a respective shift mouthpiece (12) for each connecting element in the plurality of connecting elements, wherein each respective shift mouthpiece includes first functional regions (42, 42a) for a movement in a first direction and second functional regions (34, 34a) for a movement in a second direction, opposite the first direction, wherein the first functional regions (42, 42a) and the second functional regions (34, 34a) are axially symmetrical; and,
an actuation device (18) for actuating the plurality of connecting elements (10), the actuation device including;
a control shaft (20) mounted in a rotatable manner or in a swiveling and axially movable manner for actuating the plurality of connecting elements (10);
at least one shift finger (26) for acting on at least one connecting element (10) from the plurality of connecting elements (10) for the engagement of gear ratio steps; and,
at least one secondary control element (28) for acting on the at least one connecting element (10) for the disengagement and/or locking of gear ratio steps, wherein:
each of the at least one secondary control element includes third functional regions (40, 40a) for a movement in the first direction and fourth functional regions (32, 32a) for a movement in the second direction:
the third functional regions (40, 40a) and the fourth functional regions (32, 32a) are axially symmetrical;
in a neutral position the at least one secondary control element (28) extends perpendicular to a direction of movement or axial direction (16) of the at least one connecting element (10); and,
for the respective shift mouthpiece (12) and the at least one secondary control element (28), all of the functional regions comprise curved surfaces.

2. The transmission device, as described in claim 1, wherein the respective shift mouthpiece (12) is asymmetrically formed with respect to the plane that is defined by the axis of rotation (30) of the control shaft (20).

3. The transmission device as described in claim 1, wherein also the at least one shift finger (26) in its neutral position extends perpendicular to the direction of movement or axial direction (16) of the at least one connecting element (10).

4. The transmission device as described in claim 2, wherein the at least one shift finger element (26) in its neutral position extends perpendicular to the direction of movement or axial direction (16) of the at least one connecting element (10).

5. The transmission device as described in claim 1, wherein the first through fourth functional regions (32, 32a, 34, 34a, 40, 40a, 42, 42a) are configured in the manner of cycloids and/or involutes.

6. The transmission device as described in claim 1, wherein the respective shift mouthpiece (12) is designed in a closed configuration.

7. The transmission device as described in claim 1, wherein the at least one secondary control element (28) and/or the at least one shift finger element (26) is fixed to the control shaft (20) by a respective opening in the at least one secondary control element (28) or the at least one shift finger element (26).

8. The transmission device as described in claim 1, wherein each of the at least one connecting element (10) has a single shift mouthpiece (12) for the selective engagement of a main control element (26).

9. The transmission device as described in claim 1, wherein the at least one secondary control element (28) is displaceable so that respective portions of the first through fourth functional regions (32, 32a, 34, 34a, 40, 40a, 42, 42a) contact each other for the movement in the same and opposite directions during a movement of at least one connecting element (10) that is caused by the at least one secondary control element (28) being directed in the direction of the neutral position of at least one connecting element (10) and wherein the respective shift mouthpiece (12) and the at least one secondary control element (28) are each configured in a curved shape, at least in the respective portions.

10. The transmission device as described in claim 1, wherein the respective shift mouthpiece (12) and the at least one secondary control element (28) each have fifth or sixth functional regions (36, 36a or 38, 38a) for locking, the fifth functional regions (36, 36a) of the at least one secondary control element (28) being axially symmetric with respect to the plane defined by the axis of rotation (30) of the control shaft (20) and the direction of movement or axial direction (16) of at least one connecting element (10) while the at least one secondary control element (28) is in the neutral position, and the sixth functional regions (38, 38a) of the respective shift mouthpiece (12) being axially symmetric with respect to the plane defined by the axis of rotation (30) of the control shaft (20).

* * * * *